United States Patent [19]
Dalessandro

[11] Patent Number: 5,853,248
[45] Date of Patent: Dec. 29, 1998

[54] RADIAL THRUST BEARING

[76] Inventor: Frank Dalessandro, 291 Park St., New Canaan, Conn. 06840

[21] Appl. No.: 870,975

[22] Filed: Jun. 6, 1997

Related U.S. Application Data

[63] Continuation of Ser. No. 532,074, Sep. 22, 1995, abandoned.
[51] Int. Cl.$^6$ ...................................................... F16C 17/10
[52] U.S. Cl. ........................... 384/192; 384/202; 384/206
[58] Field of Search ..................................... 384/206–214, 384/192, 202

[56] References Cited

U.S. PATENT DOCUMENTS 3,037,822  6/1962  Plummer .

FOREIGN PATENT DOCUMENTS

| | | |
|---|---|---|
| 1589171 | 4/1970 | France . |
| 2296136 | 7/1976 | France . |
| 2408935 | 6/1979 | France . |
| 3017452 | 11/1981 | Germany . |
| 3347096 | 8/1984 | Germany . |

*Primary Examiner*—Lenard A. Footland
*Attorney, Agent, or Firm*—Dilworth & Barrese

[57] ABSTRACT

A monolithically formed bearing is disclosed for use with a rotatable shaft positioned within a supporting structure which includes a bearing body having an internal bore extending partially therethrough and defining a cylindrical bearing surface for receiving and supporting the rotatable shaft, an external bearing surface having a radially inwardly tapered leading edge for engaging a complementary first abutment surface defined within an interior cavity of the supporting structure, an annular thrust collar projecting beyond the leading edge of the external bearing surface for engaging a corresponding second abutment surface defined within the interior cavity of the supporting structure, and an annular retention flange depending from the periphery of the bearing body to retain the bearing body within the interior cavity of the supporting structure.

27 Claims, 6 Drawing Sheets

RADIAL THRUST BEARING

This is a continuation of application Ser. No. 08/532,074 filed on Sep. 22, 1995, now abandoned.

BACKGROUND OF THE INVENTION

1. Field of the Invention

This invention relates to bearings, and more particularly, to a monolithically formed radial thrust bearing for use with an electric motor assembly.

2. Description of the Related Art

Bearings are well known in the art and are typically employed to support rotating shafts. The design and construction of a bearing generally depends upon the magnitude of the load exerted by the shaft. Other design factors include heat treatment and dissipation, and the rotational speed of the shaft. Often, bearings will be supplied with a lubricant to reduce friction and dissipate heat, and a radial flange or plate may be provided to position the bearing in a housing and support a thrust load directed along the axis of the shaft.

In the past, radial thrust bearing assemblies for small electric motors have included a bearing sleeve to support the rotating motor shaft, a retainer to maintain the bearing sleeve in a support housing, and a thrust disc to support an axial load exerted by the shaft. The use of multiple components in such an assembly is costly since each piece must be fabricated separately and subsequently assembled in a time consuming manner. In addition, the components may become misaligned during use causing the individual elements to vibrate with respect to one another resulting in noise and wear on the components. Moreover, misalignment of the components may affect the shaft itself, causing wear and the possibility of failure.

It would be beneficial to provide a one piece monolithically formed self-lubricating bearing for supporting the radial and axial loads exerted by the rotating shaft of an electric motor or similar machine. The subject invention is directed to a bearing having such features and advantages.

SUMMARY OF THE INVENTION

The subject invention is directed to a unique monolithically formed bearing for use with a rotatable shaft of a small electric motor housed within a supporting structure. In a preferred embodiment of the subject invention the bearing includes a bearing body having an internal bore extending partially therethrough and defining a cylindrical bearing surface for receiving and supporting the rotatable shaft. An external bearing surface having a radially inwardly tapered leading edge is defined by the bearing body for engaging a complementary first abutment surface defined within an interior cavity of the supporting structure, and an annular thrust collar projects beyond the leading edge of the external bearing surface for engaging a corresponding second abutment surface defined within the interior cavity of the supporting structure.

In another embodiment of the subject invention, an annular thrust collar projects from a first end of the bearing body for engaging a corresponding first abutment surface defined within an interior cavity of the supporting structure, and an annular retention flange depends from a second end of the bearing body to align and retain the bearing body within the interior cavity of the supporting structure. The annular retention flange has a circumferential shoulder formed thereon for engaging a corresponding third abutment surface defined within the interior cavity of the supporting structure.

Preferably, the annular thrust collar and the annular retention flange are in axial alignment with the cylindrical bearing surface of the internal bore, and the internal bore extends to a terminal bearing wall against which an end of the shaft bears when there is a load thereon. In use, the thrust collar, the external bearing surface, and the circumferential shoulder are spaced from the respective abutment surfaces defined within the interior cavity of the supporting structure when there is no load on the shaft, and when there is a load on the shaft the thrust collar, the external bearing surface, and the circumferential shoulder bear against the respective abutment surfaces of the supporting structure while the shaft is rotatably supported within the internal bore of the bearing body.

These and other features of the monolithically formed radial thrust bearing of the subject invention will become more readily apparent from the following detailed description of the invention taken in conjunction with the drawings.

BRIEF DESCRIPTION OF THE DRAWINGS

So that one skilled in the art to which the subject invention appertains will better understand how to make and use the bearing disclosed herein, preferred embodiments thereof will be described hereinbelow with reference to the drawings wherein.

DETAILED DESCRIPTION OF THE PREFERRED EMBODIMENTS

Figure 1:
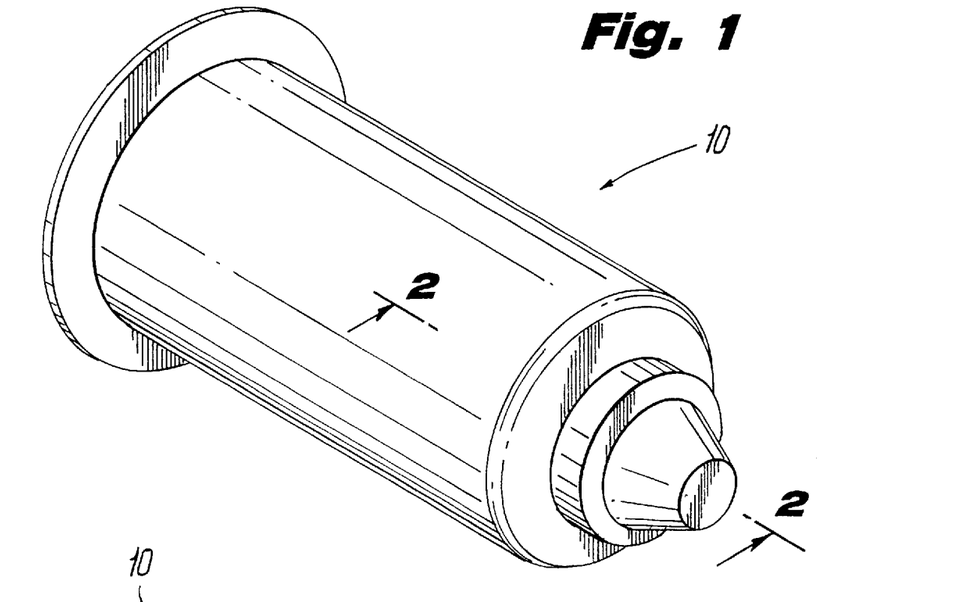
FIG. 1 is a perspective view of a housing which supports a motor and a bearing assembly.
Figure 2:
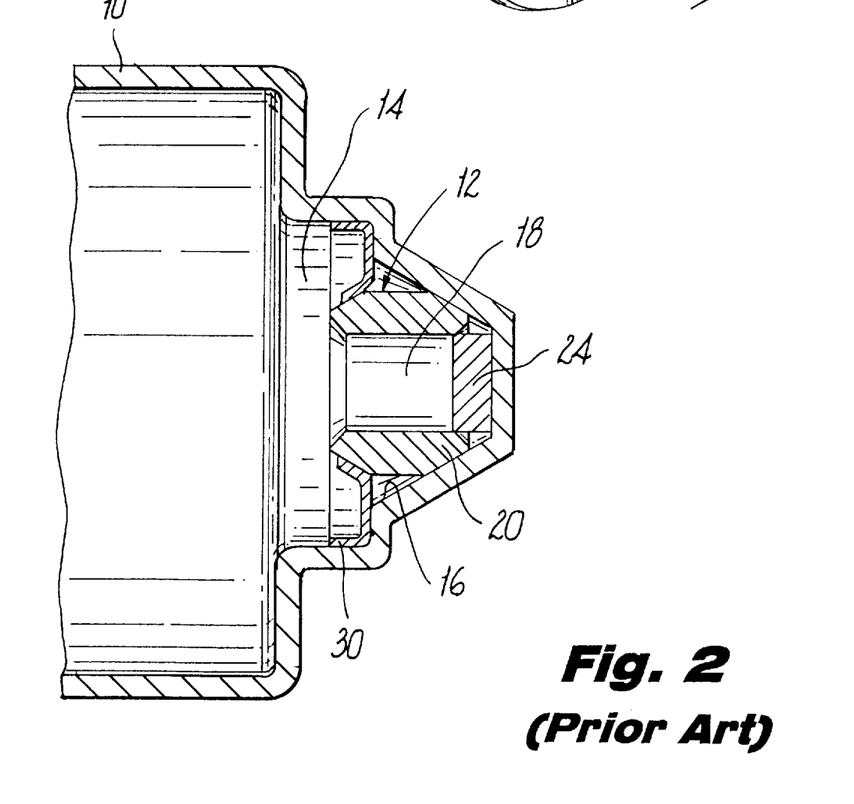
FIG. 2 is a cross-sectional view taken along line 2—2 of FIG. 1, illustrating a motor and a prior art bearing assembly which supports the shaft of the motor.

Referring now to the drawings wherein like reference numerals identify similar structural elements and/or components described herein, there is illustrated in FIG. 1 a support housing 10 which encloses an electric motor assembly and a bearing assembly which retains and supports the shaft of the motor. As best seen in FIG. 2, where a prior art bearing assembly designated generally by reference numeral 12 is illustrated, support housing 10 defines an enclosure for a conventional electric motor assembly 14. The enclosure defines a forward interior cavity 16 for accommodating bearing assembly 12 which rotatably supports the shaft 18 of motor assembly 14.

Figure 3:
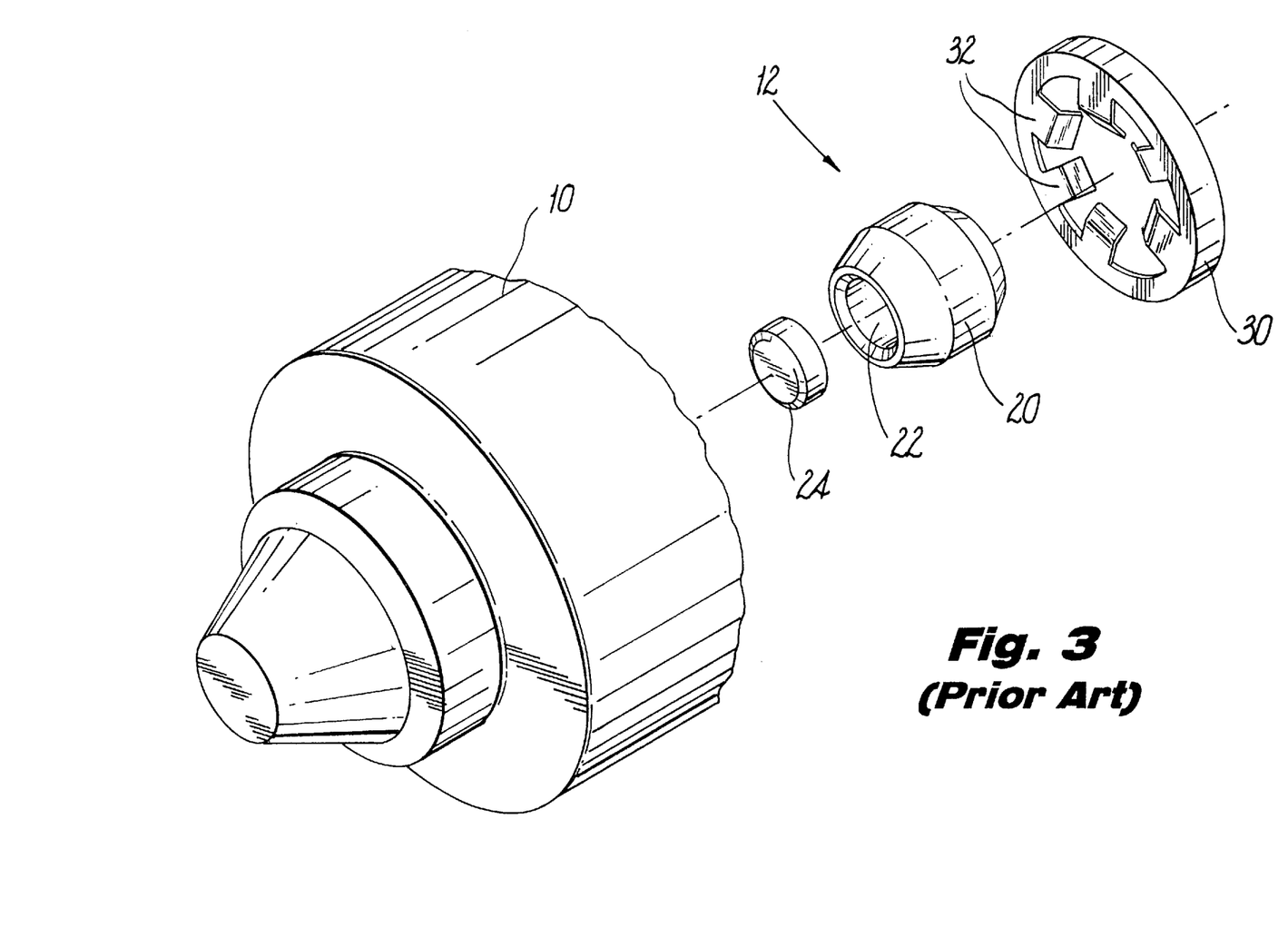
FIG. 3 is an exploded perspective view of the prior art bearing assembly shown in FIG. 2 with parts separated for ease of illustration.

Referring to FIG. 3, prior art bearing assembly 12 is comprised of three separate components, each fabricated from a different material and each having a distinct function. In particular, bearing assembly 12 includes a spherical bearing component 20 formed from sintered metal and impregnated with a chemical lubricant. An axial bore 22 extends through the body of bearing component 20 to rotatably support the shaft 18 of motor assembly 14. Bearing assembly 12 further includes an annular thrust disc 24 which is accommodated at the forward end of axial bore 22 to support thrust loads directed along the axis of the motor shaft. The third component of bearing assembly 12 is an annular retaining cup 30 formed of spring steel and having a plurality of spaced apart radially inwardly projecting fingers 32 for engaging and supporting spherical bearing 20. The outer periphery of retaining cup 30 aligns and supports the entire bearing assembly within the interior cavity 16 of support housing 10. It will be readily apparent to those skilled in the art that the multi-component construction of the prior art bearing assembly 12 is costly to fabricate and difficult to align within the interior cavity 16 of housing 10 during assembly.

Figure 4:
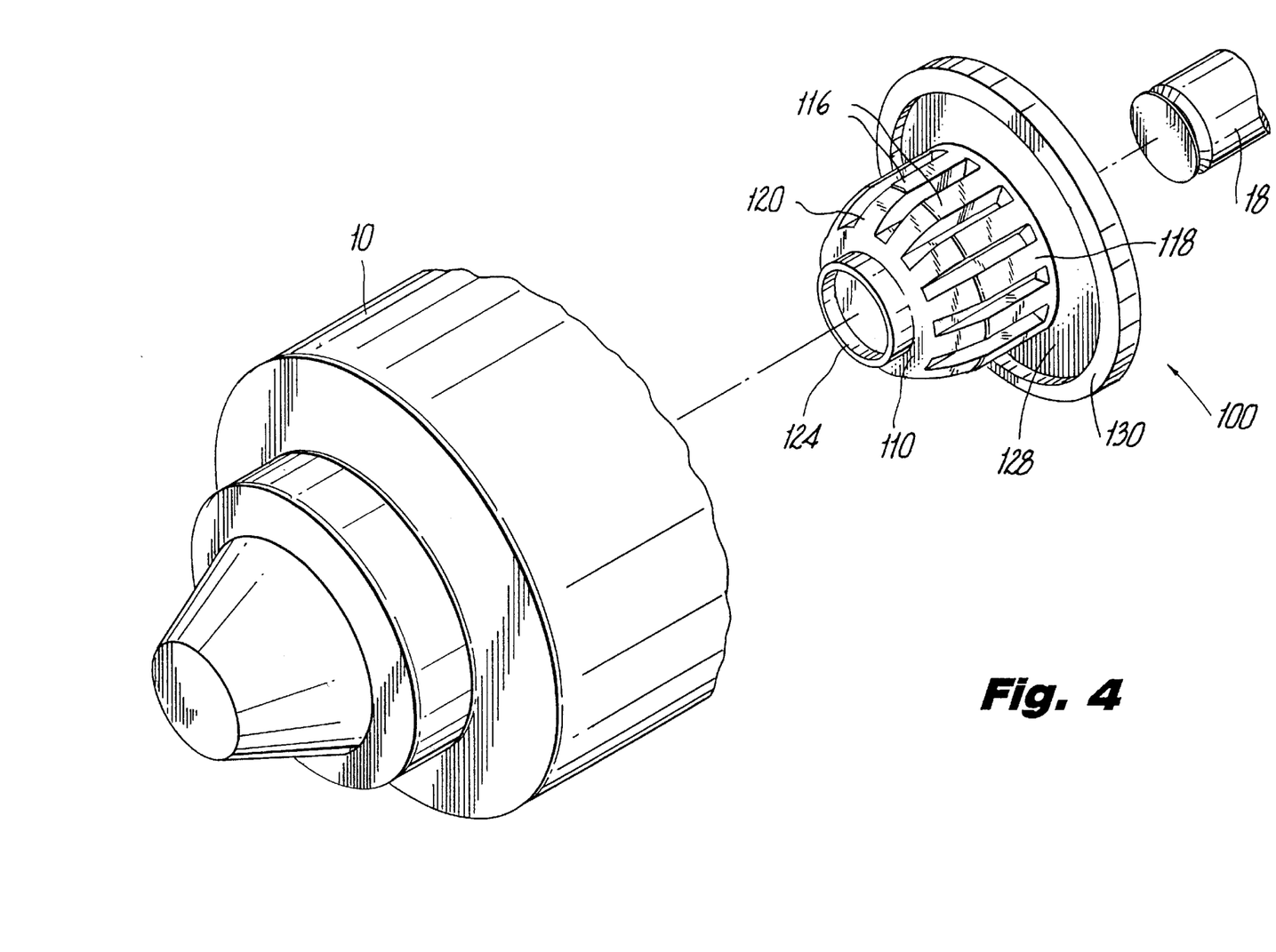
FIG. 4 is a perspective view of the monolithically formed bearing assembly of the subject invention separated from a supporting housing and the shaft of a motor.

Referring now to FIG. 4, there is illustrated a monolithically formed radial thrust bearing constructed in accordance with a preferred embodiment of the subject invention and designated generally by reference numeral 100. As illustrated, bearing 100 supports a rotatable motor shaft 18 and is accommodated within the interior cavity 16 defined within the support housing 10 of motor assembly 14. Bearing 100 is preferably formed from a self-lubricating thermoplastic material, such as, for example, a glass-fiber reinforced polyketone.

Bearing 100 includes a generally cylindrical bearing body 110 having a cylindrical axial bore 112 extending partially therethrough and terminating in a forward bearing wall 114. Axial bore 112 is dimensioned and configured to receive and rotatably support the shaft 18 of motor assembly 14, the forward end of which bears against wall 114 when there is a load on the shaft. The outer periphery of bearing body 110 is defined by a plurality of circumferentially spaced apart support ribs 116 which taper radially inwardly at the respective terminal ends thereof to form a spherical leading edge 120 of an exterior bearing surface 118. The spherical leading edge 120 bears against a corresponding abutment surface 122 defined within the interior cavity 16 of support housing 10 when there is a load on motor shaft 18.

Figures 5, 6, 7:
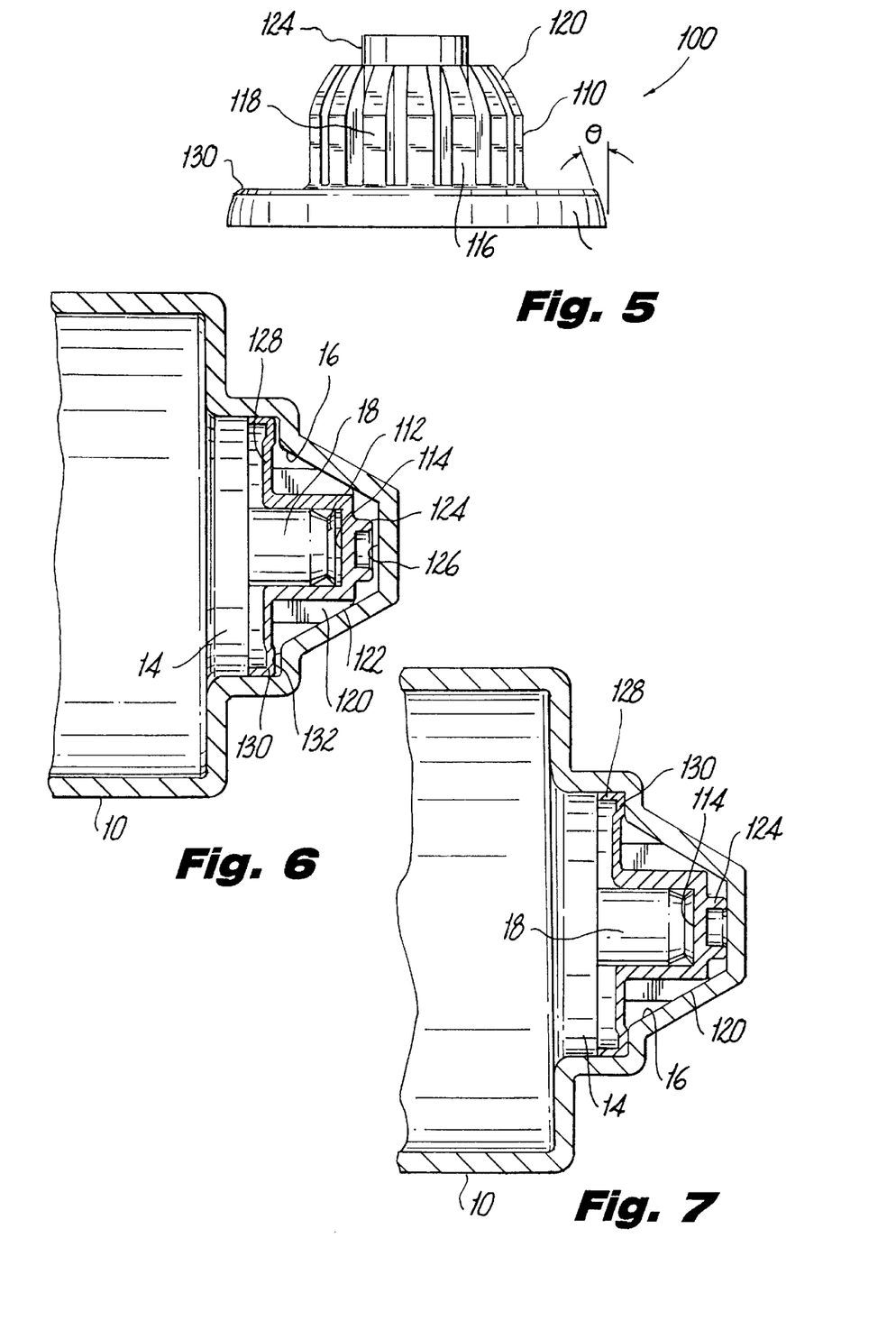
FIG. 5 is a side elevational monolithically formed view of the bearing assembly of the subject invention illustrated in FIG. 4.
FIG. 6 is a cross-sectional view as in FIG. 2, illustrating the motor and the subject bearing assembly when there is no load applied to the motor shaft and the bearing assembly is spaced from the interior wall of the support housing.
FIG. 7 is a cross-sectional view as in FIG. 6, illustrating the motor and the subject bearing assembly when there is a load applied to the motor shaft and the bearing assembly is urged against the interior wall of the support housing.

An annular thrust collar 124 projects from the forward end of bearing body 110 to support a thrust load directed along the longitudinal axis of the shaft. Thrust collar 124 will engage and bear against a corresponding abutment surface 126 defined within interior cavity 16 under such loading condition. An annular retention flange 128 depends from the rear end of bearing body 110 adjacent the spherical leading edge 120 of bearing surface 118 to retain bearing 100 within the interior cavity 16 of support housing 10, and a circumferential shoulder 130 is formed about the periphery of the retention flange to engage and bear against a corresponding abutment surface 132 defined within the interior cavity. Bearing 100 is constructed such that axial bore 112, thrust collar 124, and retention flange 128 are all in axial alignment with one another. Shoulder 130 is relatively flexible with respect to the remainder of the retention flange to better facilitate axial alignment of the bearing and the motor shaft during assembly and to facilitate retention of the bearing body without causing significant deformation to the axial bore 112 supporting the rotatable shaft. As best seen in FIG. 5, the radially outermost peripheral surface of retention flange 128 is preferably flared outwardly at an angle $\theta$ of between 0° and 30° to enhance the interference or frictional fit of the bearing within interior cavity 16.

Referring to FIGS. 6 and 7, when there is no load on motor shaft 18, bearing 100 is oriented within cavity 16 in the manner illustrated in FIG. 6. At such a time, the spherical leading edge 120 of the exterior bearing surface 118 of bearing 100 is in close proximity to (or touching) abutment surface 122, and the thrust collar 124 and circumferential shoulder 130 are spaced from abutment surfaces 126 and 132, respectively. In use, when there is a load on motor shaft 18 the shaft will translate in an axial direction with respect to support housing 10, exerting a thrust load on bearing 100 directed along the axis of the shaft. Thereupon, motor shaft 18, will thrust against the terminal bearing wall 114 defined within axial bore 112, shifting bearing 100 forward within interior cavity 16. Consequently, as illustrated in FIG. 7, the rear end of the bearing body will flex in the area of the circumferential shoulder of the retention flange to allow the spherical leading edge 120, the thrust collar 124, and the circumferential shoulder 130 to engage and bear against abutment surfaces 122, 126 and 132, respectively, to support the axial thrust load exerted by the motor shaft.

Figure 8:
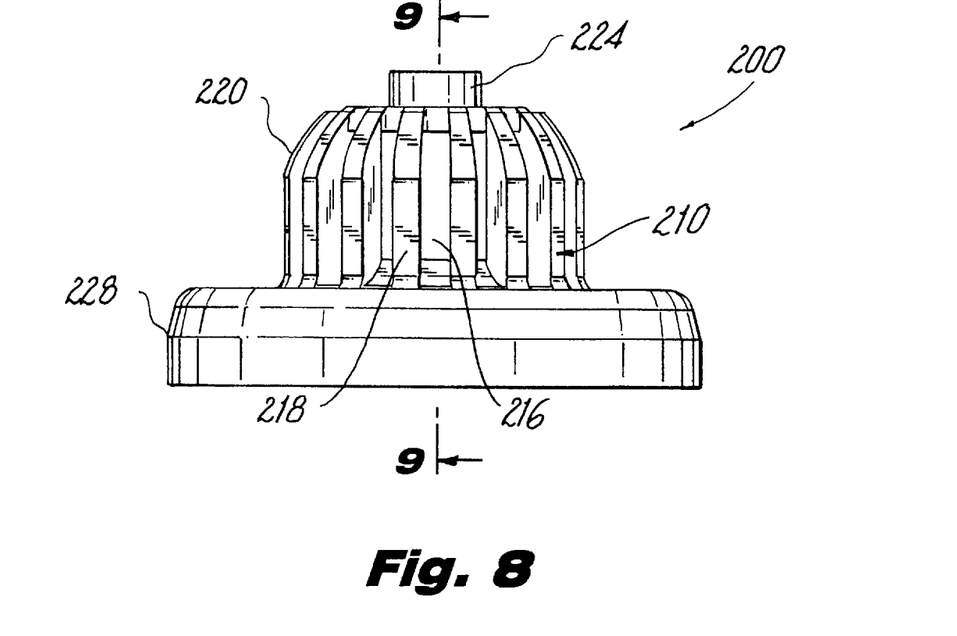
FIG. 8 is a side elevational view of another radial thrust bearing constructed in accordance with a preferred embodiment of the subject invention.
Figure 9:
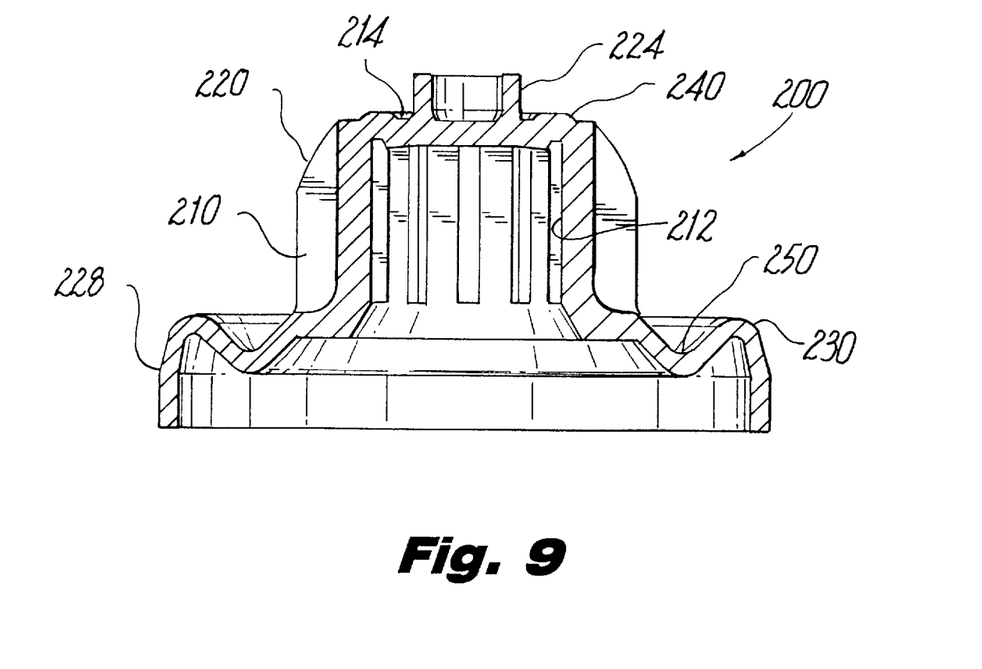
FIG. 9 is a cross-sectional view taken along line 9—9 of FIG. 8.

Referring now to FIGS. 8 and 9 and also to FIG. 6, there is illustrated another preferred embodiment of a radial thrust bearing designated generally by reference numeral 200. Bearing 200 is substantially similar to the bearing 100 described hereinabove in that it includes a bearing body 210 having a cylindrical axial bore 212 extending partially therethrough and terminating in a first end having a forward bearing wall 214. Axial bore 212 is dimensioned and configured to receive and rotatably support the shaft 18 of motor assembly 14 (FIG. 6), the forward end of which bears against wall 214 when there is a load on the shaft. The outer periphery of bearing body 210 is defined by a plurality of circumferentially spaced apart support ribs 216 which taper radially inwardly at the respective terminal ends thereof to form a spherical leading edge 220 of an exterior bearing surface 218. The spherical leading edge bears against a corresponding abutment surface 122 (FIG. 6) defined within the interior cavity 16 of support housing 10 when there is a load on motor shaft 18. An annular retention flange 228 is positioned at a rear end of the bearing body, and an annular thrust collar 224 is positioned at a forward end of the bearing body. Thrust collar 224 will engage and bear against a corresponding abutment surface 126 (FIG. 6) defined within interior cavity 16 under a loading condition. Annular retention flange 228 will retain bearing 200 within the interior cavity 16 of support housing or structure 10. A circumferential shoulder 230 is formed about the periphery of the retention flange to engage and bear against a corresponding abutment surface 132 (FIG. 6) defined within the interior cavity. However, as best seen in FIG. 9, bearing 200 has structural aspects which differ from bearing 100, including a circumferential flexure region 240 which circumscribes thrust collar 224, and a flexure channel 250 which extends about the inner periphery of retention flange 228. These regions allow bearing 200 to better accommodate axial thrust forces generated during use and reduce stresses from misalignment.

Figure 10:
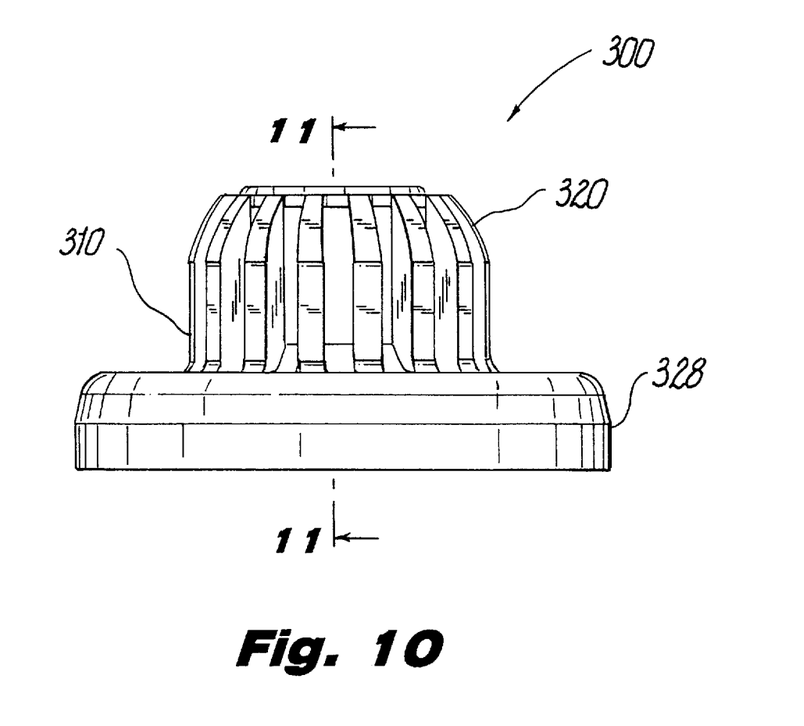
FIG. 10 is a side elevational view of another radial thrust bearing constructed in accordance with a preferred embodiment of the subject invention.
Figure 11:
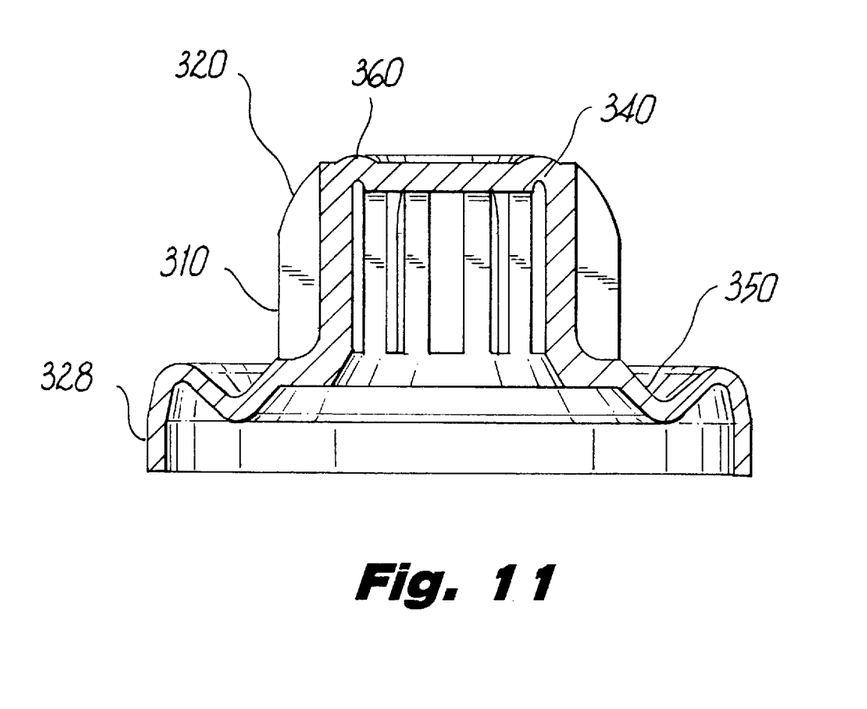
FIG. 11 is a cross-sectional view taken along line 11—11 of FIG. 10.

Another preferred embodiment of the radial thrust bearing of the subject invention is illustrated in FIGS. 10 and 11, and is designated generally by reference numeral 300. Bearing 300, like bearing 200, includes a bearing body 310 having a spherical leading edge 320, a flexure region 340 adjacent the leading edge, a retention flange 328 adjacent a rear end of the bearing body, and a flexure channel 350 associated with the retention flange. Bearing 300 differs however, in that it does not have a thrust collar provided at the forward end thereof to bear against abutment surface 126. Accordingly, in use, axial thrust loads will be supported by the spherical leading edge 320.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A monolithically formed bearing for use with a rotatable shaft positioned within a supporting structure, the bearing comprising a bearing body having a first end and a second open end dimensioned to receive the rotatable shaft and having an internal bore extending partially therethrough and defining a cylindrical bearing surface for receiving and supporting the rotatable shaft, an external bearing surface positioned adjacent the first end of the bearing body and having a radially inwardly tapered leading edge for engaging a complementary first abutment surface defined within an interior cavity of the supporting structure, and an annular thrust collar projecting from the first end of the bearing body beyond the leading edge of the external bearing surface for engaging a corresponding second abutment surface defined within the interior cavity of the supporting structure.

2. A bearing as recited in claim 1, wherein the annular thrust collar is in axial alignment with the cylindrical bearing surface of the internal bore.

3. A bearing as recited in claim 2, wherein the interior bore of the bearing body extends to a terminal bearing wall against which an end of the shaft bears when there is a load thereon.

4. A bearing as recited in claim 3, wherein an annular retention flange depends from the periphery of the bearing body to retain the bearing body within the interior cavity of the supporting structure.

5. A bearing as recited in claim 4, wherein the thrust collar and the external bearing surface of the bearing body are spaced from the abutment surfaces defined within the interior cavity of the supporting structure when there is no load on the shaft, and when there is a load on the shaft the thrust collar and the external bearing surface bear against the abutment surfaces of the supporting structure while the shaft is rotatably supported within the internal bore of the bearing body.

6. A bearing as recited in claim 5, wherein the annular flange has a flexible circumferential shoulder formed thereon which bears against a corresponding third abutment surface defined within the interior cavity of the supporting structure when there is a load on the shaft.

7. A bearing as recited in claim 6, wherein the radially outermost peripheral surface of the annular retention flange is flared radially outwardly at an angle θ of about between 0° and 30°.

8. A bearing as recited in claim 1, wherein the bearing body is monolithically formed from a self-lubricating thermoplastic material.

9. A monolithically formed bearing for use with a rotatable shaft positioned within a supporting structure, the bearing comprising a bearing body having a first end and a second open end dimensioned to receive the rotatable shaft, an internal bore extending partially through the bearing body and defining a cylindrical bearing surface for receiving and supporting the rotatable shaft, the cylindrical bore being closed at the first end, an annular thrust collar projecting from the first end of the bearing body for engaging a corresponding first abutment surface defined within an interior cavity of the supporting structure, and an annular retention flange depending from a second end of the bearing body to retain the bearing body within the interior cavity of the supporting structure.

10. A bearing as recited in claim 9, wherein the bearing body includes an external bearing surface having a radially inwardly tapered leading edge adjacent the annular thrust collar for engaging a complementary second abutment surface defined within the interior cavity of the supporting structure.

11. A bearing as recited in claim 10, wherein the annular thrust collar is in axial alignment with the cylindrical bearing surface of the internal bore.

12. A bearing as recited in claim 11, wherein the interior bore of the bearing body extends to a terminal bearing wall against which an end of the shaft bears when there is load thereon.

13. A bearing as recited in claim 12, wherein the thrust collar and the external bearing surface of the bearing body are spaced from the first and second abutment surfaces when there is no load on the shaft, and when there is a load on the shaft the bearing collar and the external bearing surface bear against the abutment surfaces of the supporting structure while the shaft is rotatably supported within the internal bore of the bearing body.

14. A bearing as recited in claim 13, wherein the annular retention flange has a circumferential shoulder formed thereon which bears against a corresponding third abutment surface defined within the interior cavity of the supporting structure when there is a load on the shaft.

15. A monolithically formed bearing for use with a rotatable shaft positioned within a supporting structure, the bearing comprising a bearing body having a first end and a second open end dimensioned to receive the rotatable shaft and having an internal bore extending partially therethrough and defining a cylindrical bearing surface for receiving and supporting the rotatable shaft, an external bearing surface having a radially inwardly tapered leading edge positioned adjacent the second end of the bearing body for engaging a complementary first abutment surface defined within an interior cavity of the supporting structure, an annular thrust collar projecting beyond the leading edge of the external bearing surface for engaging a corresponding second abutment surface defined within the interior cavity of the supporting structure, and an annular retention flange positioned adjacent the second end of the bearing body projecting radially outwardly from the periphery of the bearing body to retain the bearing body within the interior cavity of the supporting structure.

16. A bearing as recited in claim 15, wherein the annular retention flange has a circumferential shoulder formed thereon for engaging a corresponding third abutment surface defined within the interior cavity of the supporting structure.

17. A bearing as recited in claim 16, wherein the annular thrust collar and the annular retention flange are in axial alignment with the cylindrical bearing surface of the internal bore.

18. A bearing as recited in claim 17, wherein the interior bore of the bearing body extends to a terminal bearing wall against which an end of the shaft bears when there is a load on the shaft.

19. A bearing as recited in claim 18, wherein the bearing collar, the external bearing surface, and the circumferential shoulder are spaced from the respective abutment surfaces defined within the interior cavity of the supporting structure when there is no load on the shaft, and when there is a load on the shaft the bearing collar, the external bearing surface, and the circumferential shoulder bear against the respective abutment surfaces of the supporting structure while the shaft is rotatably supported within the internal bore of the bearing body.

20. A bearing as recited in claim 15, wherein the bearing body is monolithically formed from a self-lubricating thermoplastic material.

21. A monolithically formed bearing for use with a rotatable shaft positioned within a supporting structure, the bearing comprising a bearing body having a forward end and an open rear end dimensioned to receive the rotatable shaft, an internal bore extending partially through the bearing body and defining a cylindrical bearing surface for receiving and supporting the rotatable shaft, an external bearing surface having a radially inwardly tapered spherical leading edge adjacent the forward end of the bearing body for engaging a complementary first abutment surface defined within an interior cavity of the supporting structure, and an annular retention flange depending from the periphery of the bearing body adjacent the rear end thereof to retain the bearing body within the interior cavity of the supporting structure, the retention flange having a region of flexibility formed about a radially inner periphery thereof.

22. A bearing as recited in claim 21, wherein an annular thrust collar projects beyond the leading edge of the external bearing surface to engage a corresponding second abutment surface defined within the interior cavity of the supporting structure.

23. A bearing as recited in claim 22, wherein the annular retention flange has a circumferential shoulder formed thereon for engaging a corresponding third abutment surface defined within the interior cavity of the supporting structure.

24. A bearing as recited in claim 22, wherein the annular thrust collar and the annular retention flange are in axial alignment with the cylindrical bearing surface of the internal bore.

25. A bearing as recited in claim 24, wherein the bearing collar, the external bearing surface, and the circumferential shoulder are spaced from the respective abutment surfaces defined within the interior cavity of the supporting structure when there is no load on the shaft, and when there is a load on the shaft the bearing collar, the external bearing surface, and the circumferential shoulder bear against the respective abutment surfaces of the supporting structure while the shaft is rotatably supported within the internal bore of the bearing body.

26. A bearing as recited in claim 21, wherein the interior bore of the bearing body extends to a terminal bearing wall against which an end of the shaft bears when there is a load on the shaft.

27. A bearing as recited in claim 21, wherein the bearing body is monolithically formed from a self-lubricating thermoplastic material.

* * * * *